United States Patent [19]

Vilain

[11] 4,111,435
[45] Sep. 5, 1978

[54] FLUID-TIGHT SEALING DEVICES

[75] Inventor: Robert Vilain, Maisons Alfort, France

[73] Assignee: Entreprise d'Equipements Mecaniques et Hydrauliques EMH, France

[21] Appl. No.: 687,646

[22] Filed: May 18, 1976

Related U.S. Application Data

[63] Continuation of Ser. No. 522,287, Nov. 8, 1974, abandoned.

[30] Foreign Application Priority Data

Nov. 14, 1973 [FR] France ................... 73 40456

[51] Int. Cl.² ........................................... F16J 15/02
[52] U.S. Cl. ...................................................... 277/9
[58] Field of Search ............................. 277/9, 9.5, 123

[56] References Cited

U.S. PATENT DOCUMENTS

| | | | |
|---|---|---|---|
| 1,857,045 | 5/1932 | Dean | 277/123 |
| 1,948,211 | 2/1934 | Fritz | 285/49 X |
| 2,886,885 | 5/1959 | Reid | 285/23 |
| 3,504,509 | 4/1970 | Paulsen | 64/27 NM |

*Primary Examiner*—Robert I. Smith
*Attorney, Agent, or Firm*—Larson, Taylor and Hinds

[57] ABSTRACT

A fluid-tight sealing device for elements which have a common axis are capable of angular displacement relative one to another, and which define an enclosed space comprises a sleeve arranged for co-axial disposition relative to said elements to be engaged endwise between support surfaces provided on the elements. The sleeve is formed by rigid rings having rings of elastomeric or resilient material interposed therebetween and when in position between the support surfaces the sleeve is axially stressed in compression and is so disposed that it permits angular displacement of the elements by relative angular movement of at least one end of the sleeve in relation to the support surface engaged thereby, by torsional elasticity of the sleeve, or by a combination of both angular movement and torsional elasticity.

7 Claims, 4 Drawing Figures

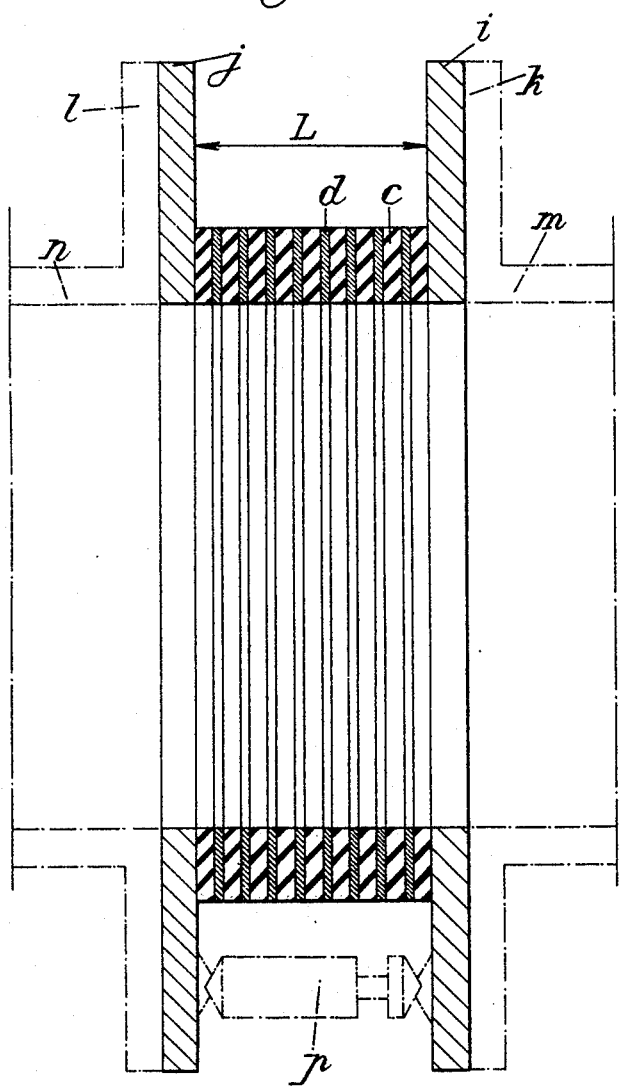

4,111,435

FLUID-TIGHT SEALING DEVICES

This is a continuation of application Ser. No. 522,287 filed Nov. 8, 1974 and now abandoned.

BACKGROUND OF THE INVENTION

This invention relates to a sealing device for effecting a fluid-tight seal between elements which have a generally common axis, which are capable of angular displacement relative one to another, and which define an enclosed space, such as may be the case, for example, when it is desired to separate two spaces of a machine in relation to a shaft turning in bearings of the machine — for example the interior and exterior of the machine, or when it is desired to effect the sealing of pipe systems at points where two neighbouring portions of the latter have to undergo certain relative angular displacements about the axis; other applications may be envisaged for the sealing device whether such applications are arrangements in which the elements are intended to move continuously, or arrangements in which angular displacement between the elements is of a limited amplitude in one direction or the other.

In the attempts to solve this problem numerous seals exist at the present time, but the known seals do not make it possible to achieve more than imperfect fluid-tightness and they do not withstand high pressures.

It is an object of the invention to make it possible to obtain seals which in all cases, and even under high pressures, provide better or almost complete fluid-sealing.

SUMMARY

According to the invention there is provided a sealing device for effecting a fluid-tight seal between elements which have a generally common axis, which are capable of angular displacement relative one to another, and which define an enclosed space, said sealing device comprising a sleeve arrangement for co-axial disposition relative to said elements, to be endwise engaged between support surfaces provided on the elements, and formed by rigid rings with interposed rings or elastomeric or resilient material and being axially stressed in compression, the arrangement being such that when disposed between said support surfaces the sleeve permits said angular displacement of the elements by relative angular movement of at least one end of the sleeve in relation to the support surface engaged thereby, by torsional elasticity of the sleeve, or by a combination of said angular movement and torsional elasticity.

This compression ensures that sealing is maintained both between the rigid and the elastomeric or resilient rings and between the support surfaces between the sleeve and the said elements. It therefore permits practically complete fluid-tightness.

The aforesaid compression will for example be maintained, in the application to a machine (or any other similar arrangement), by ball thrust or other bearings cooperating with the shaft or rotating element in question and with its frame. In the case of an application to parts of pipe systems, this will be achieved, where applicable, by any means, particularly elastic means (mechanical, hydraulic, pneumatic, or other means) tending to maintain a substantially constant distance between the ends of the two portions between which the sleeve will be interposed, while permitting these portions to effect certain relative angular displacements about the common axis.

The invention relates more particularly to certain modes of application (including, among others, the application to machines or arrangements comprising rotating elements or shafts, where it is required to separate sealingly two spaces cooperating with these shafts, the applications to portions of pipes which have to undergo relative displacements, etc.), and also certain embodiments of these arrangements; and it relates more particularly still, by way of new industrial products to means of the kind in question entailing the application of the aforesaid arrangements, and also the special elements required for their construction, and the arrangements and installations containing such means.

BRIEF DESCRIPTION OF THE DRAWINGS

FIG. 4 is a section illustrating a pipe sealing device permitting relative rotation and constructed in accordance with the invention.

DESCRIPTION OF THE PREFERRED EMBODIMENTS

In describing the invention, reference will first be made to the application thereof to a shaft rotatable inside any apparatus or machine, and it is proposed to separate sealingly along this shaft two different spaces, which may for example be two spaces inside the machine or the interior space of the latter and the outer atmosphere, etc., and for this purpose the procedure would be as follows or similar.

Figure 1:
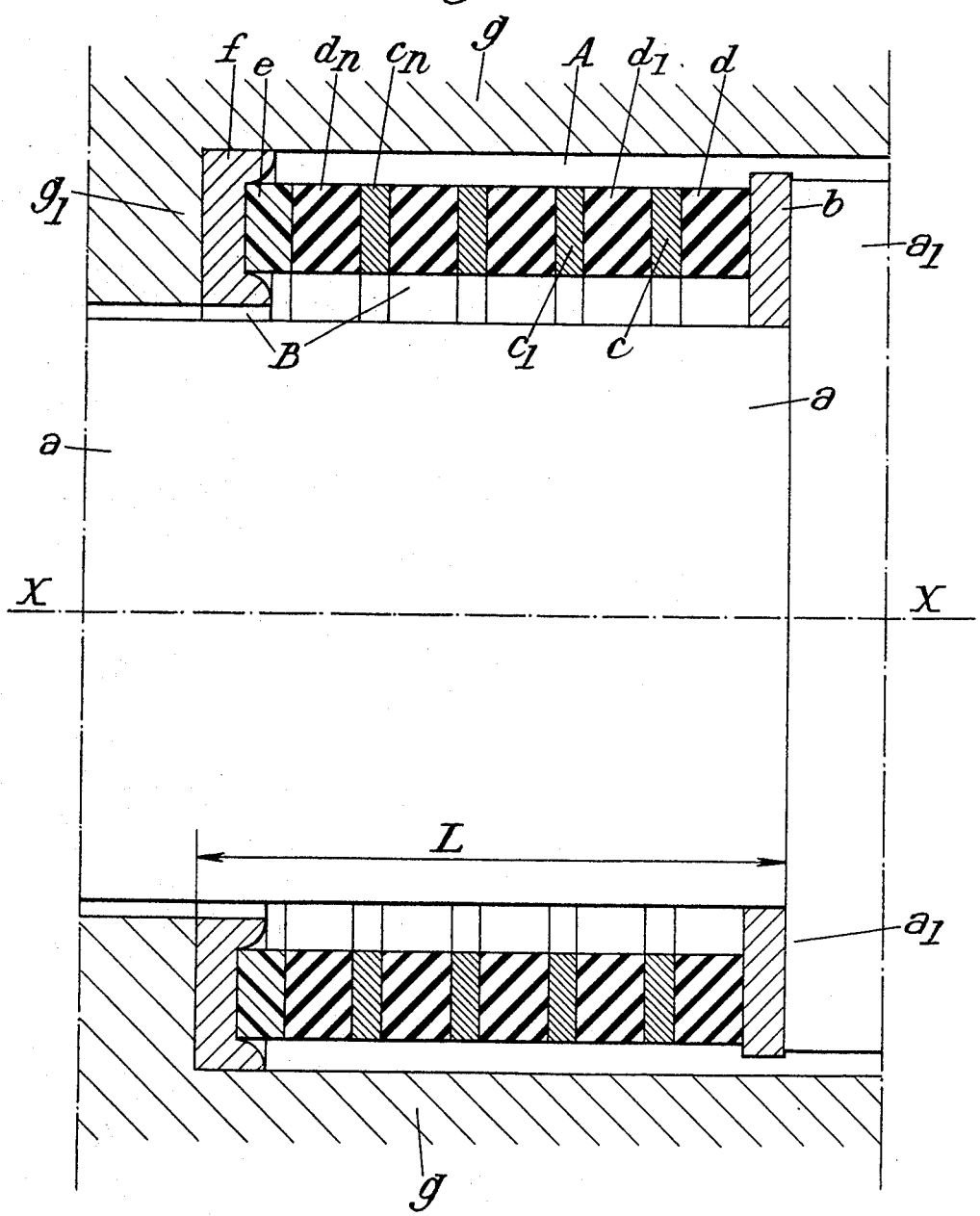
FIG. 1 diagrammatically illustrates, in axial section, a sealing device according to the invention.

Referring to FIG. 1, a shaft $a$ is rotatable about an axis X—X inside a frame shown at $g$, the shaft being supported in the usual manner by bearings (not shown).

Two spaces shown at A and B, are to be sealed one from the other, space A for example being inside the machine, and the space B for example being connected to atmosphere outside of the machine. For this purpose a sleeve co-axial with the axis X—X is interposed between support surfaces lying transversely of the axis X—X, for example shoulders or abutments $a_1$ and $g_1$ which are provided on the elements $a$ and $g$. The sleeve is composed of a series of rings or hoops $c, c_1, \ldots c_n$ of solid (particularly metallic) material, which are separated by rings $d, d_1, \ldots d_n$ of elastomeric material, particularly or neoprene, or a resilient material such as rubber.

The rings $c$ and $d$ are bonded together by means suitable for their nature, particularly by adhesive bonding or vulcanisation. Optionally, taking into account compression or precompression which will be discussed below, it might be possible simply to arrange the various parts $c$ and $d$ to bear against one another by means of respective projections or grooves which prevent them from moving in their own plane.

The sleeve is supported against the respective oppositely situated surfaces $a_1$ and $g_1$, as follows:

On the shaft side a $a_1$, advantageously through the interposition of a metal ring $b$ which is fastened to the shaft sealingly by any suitable means, while the first elastomeric ring $d$ is for example, bonded to the ring $b$; and on the frame side at $g_1$, by means permitting relative rotational movement of the sleeve $c, d$, entrained by the shaft $a$, in relation to the fixed frame $g$, it being understood that the inverse solution could likewise be adopted (fixed sleeve with provision for relative rotatability against the support $a_1$).

These means of achieving relative rotation are, for example, composed of a combination of a rigid support part $f$, particularly a metallic part, which is fastened to the frame $g$, $g_1$, and a ring $e$ of self-lubricating material, particularly of a material of the kind known commercially as Teflon (Registered Trade Mark) (polytetrafluoroethylene of PTFE), which may be bonded to the last elastomeric ring $d_n$ or to a part solid to this ring (the inverse solution, tht is to say a ring fastened to the frame and a support element $f$ fastened to the sleeve, could be adopted).

The support face of the part $f$ is expediently polished in order to achieve rotation with minimum friction and wear, it being understood that this rotation could be made possible in any other manner.

Good centring of the sleeve $c$, $d$ is achieved, for example, by laterally guiding the ring $e$ in a groove in the support part $f$.

An elastic sleeve is thus provided which makes a perfect seal, preferably with the additional step of subjecting the sleeve to axial compression either before or after it is fitted in position.

The distance L between the abutments $a_1$, $g_1$ is determined in such a manner that under the operating conditions of the apparatus or machine this distance is expediently shorter than the axial length of the sleeve before positioning thereof between the abutments. The reaction force resulting from this compression will be taken by any ball thrust or other bearings, not shown, which are used for mounting the shaft $a$ in its frame $g$.

The previously mentioned pre-stressing of the sleeve arrangement, which stressing is parallel to the axis X—X of rotation, has the main effect of achieving continuous contact between the rubbing surfaces of the parts $e$, $f$, if this pressure is sufficient, and of preventing any passage of fluid between the abutments despite the relative rotation. Furthermore, it has the secondary effect of improving the resistance of the elastomer material of the ring $d$ to the penetration of the fluid in the event of this material being slightly porous.

Finally it can be seen that the insertion of a sleeve of the kind just described between the two parts $a$ and $g$ has the effect of completely separating the two spaces A and B situated on opposite sides of the sleeve, despite the differences in pressure which may intervene respectively between the two spaces A and B, and also despite the rotary movement of the shaft.

It should also be noted that the part $e$, which may be thin and deformable, is pressed by a ring of elastomeric material such as $d_n$ which can adapt itself to any defects in shape of the support part $f$, for which consequently accurate construction is not required.

Taking as starting point the embodiment which has just been described, many variants can be conceived.

Thus, the inside and outside diameters of the elastomeric rings $d$, and those of the rubbing surface between the elements $e$ and $f$, which have been assumed to be equal in the case of FIG. 1 for the purpose of simplification, could be different so as to obtain any desired contact pressure between the elements $e$ and $f$, depending on the pre-stressing of the rings $d$.

Furthermore, the means of support at the ends of the sleeve could be different from those shown in the drawing. For example, as indicated in FIG. 2, at the end $a$, $a_1$ the fastening is made by adhesion or by the simple supporting of the elastomeric material.

Figure 2:
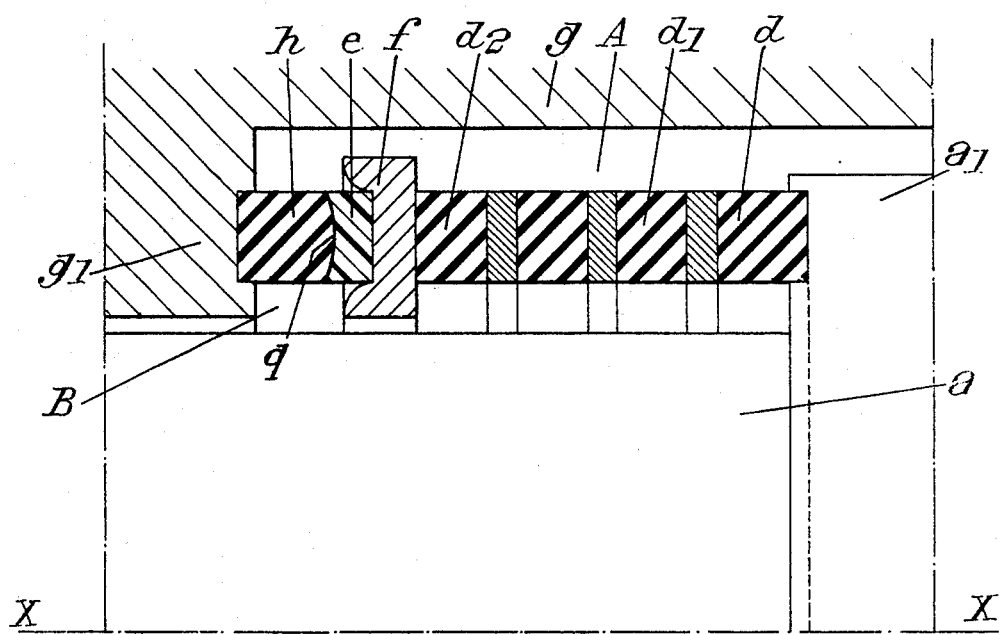
FIGS. 2 and 3 illustrate alternative embodiments of the invention.

Similarly, at the opposite end, by reversing the roles of the parts $e$ and $f$ it is possible to have the ring $e$ of self-lubricating material supported by the abutment $g_1$, either directly or with the interposition of an elastomeric ring $h$, while the supporting part $f$ is provided at the corresponding end of the sleeve constituting the seal (FIG. 2).

The support surface between the self-lubricating ring $e$ and the elastomer $h$ can, if desired, be curved, as indicated at $q$, in order to obtain better distribution of pressure.

Instead of permitting relative rotational displacements between one of the ends of the sleeve and the element in question, in the embodiments described above it is possible to provide this ability to rotate or slide in the actual interior of the sleeve, which is thus separated into two parts adapted to rotate in relation to one another, particularly by the insertion of self-lubricating elements, as described above, for example at the middle of the sleeve or in any other position.

Figure 3:
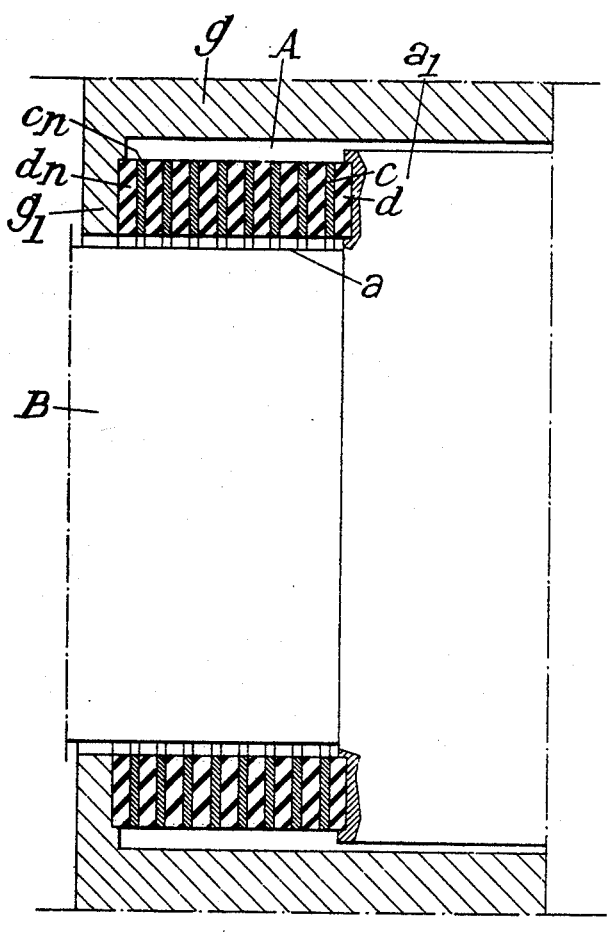

FIGS. 3 and 4 illustrate applications in which the angular displacements between the two parts of the sleeve are slight, in which case these displacements can be obtained through the ability of the elastomer to withstand shearing stresses, so that the ends of the sleeve can be fastened to the oppositely situated parts of the said elements.

FIG. 3 shows the application to a shaft adapted to turn in its frame, but with slight angular amplitudes. The seal is composed of a sleeve $c$, $d$ of the kind described above but having its end rings, which are of metal or elastomer, fixed in relation to the oppositely situated faces of the elements $a$ and $g$ for example through adhesion to the said faces in the case of rings $d$ of elastomer.

FIG. 4 illustrates another embodiment to be provided between the parts of pipe systems which are adapted to undergo certain rotation movements in relation to one another about their common axis; the seals are of similar construction to the embodiment just described in connection with FIG. 3, and the two end rings $i$ and $j$ are fastened to two flanges $k$ and $l$ solid with the pipes $m$ and $n$ which are to be connected (FIG. 4).

In a case of this kind (or in that shown in FIG. 3) the sleeve forming the seal is subjected to pre-stressing before it is placed in position, for example utilizing jacks such as $p$, FIG. 4, which are interposed between the rings $i$ and $j$, these jacks being operated so as to effect stressing until the axial distance L between the ends of the sleeve is slightly less than the distance L between the flanges $k$ and $l$ of the corresponding parts of the pipes which are to be joined together.

In this case it is necessary to maintain this pre-stressing after installation, that is to say the reaction forces due to the pre-stressing must be absorbed, which can be achieved for example;

either by suitably fastening the pipe elements $m$ and $n$ so that they can perform certain relative displacements about the axis X—X, or by providing resilient or non-resilient tensioning means (or else hydraulic, pneumatic, or like means) between the rings $i$ and $j$, so as to maintain the pre-stressing.

A seal of this kind will, for example, be fastened between the ends of the pipe elements by means of bolts between the respective parts $i$, $k$ and $j$, $l$.

The adoption of a sleeve of this kind between the ends of pipe parts adapted to perform certain relative oscillatory movements about their axis will make it possible not only to permit movements of this kind through the shearing stressing of the elastomer, but also to maintain sealing in relation to the ambient fluid whatever the differences in pressure between the ambient space and the interior of the piping.

As the result of this, whatever the embodiment adopted, it is thus possible to obtain seals suitable for multiple applications and permitting the relative displacements of the parts with which they cooperate, while maintaining complete fluid-tightness between the spaces separated by the seals in question.

It will also be noted, as a feature and advantage of the invention, that because of their ability to withstand both shearing and compressive stresses the sleeves can readily adapt themselves to any eccentricity of the axes of the two elements in question, whether the eccentricity is parallel or angular.

I claim:

1. In a flexible sealing coupling arrangement for joining substantially axially aligned pipe sections comprising opposed end flanges provided at the adjacent ends of the pipe sections and a sealing assembly located between the end flanges, the sealing assembly comprising a stack of axially aligned and alternately disposed rigid and resilient rings, the improvement wherein said sealing assembly is resiliently compressible to an axial dimension which is slightly less than the distance by which said end flanges are spaced from one another in the operative positions thereof and wherein first and second end rings are disposed at the opposite ends of said stack and attached to said flanges of said pipe sections, said end rings having a substantially greater diameter than that of said stack, said resilient rings of said stack being mounted for compression between the rigid rings adjacent thereto and said end rings, respectively, means being provided subjecting said stack to a prestressing compression so as to impart to the assembly a said axial dimension slightly less than said distance between said end flanges and for releasing said prestressing compression when said assembly is disposed between said end flanges of the pipe sections so that, in use, said assembly is expanded against the end flanges of the pipe sections.

2. An arrangement according to claim 1, wherein means are provided for fixing the axial location of said pipe sections with the said stack disposed therebetween in order to at least partially maintain said prestressing compression after the installation of said assembly between said end flanges, said fixing means being arranged to permit some relative angular displacement of said pipe sections about their axes.

3. An arrangement according to claim 1, wherein at least one tensioning device is provided between said end rings for at least partially maintaining said prestressing compression.

4. An arrangement as claimed in claim 1, wherein each of said end rings if fastened to the end flange adjacent thereto by means of bolts.

5. An arrangement according to claim 1, wherein said resilient rings are made from an elastomeric material.

6. An arrangement as claimed in claim 5, wherein said elastomeric material comprises neoprene.

7. An arrangement as claimed in claim 1, wherein prestressing means comprise at least one hydraulic jack which is initially actuated at the time of installation to impact to the assembly to an axial dimension that is slightly less than the distance between the two end flanges of the pipe sections that are to be joined, said at least one jack being subsequently released so that a part of the prestressed compression is absorbed by mechanical reaction with said flanges to enhance sealing.

* * * * *